United States Patent
Oross et al.

(10) Patent No.: US 6,826,042 B2
(45) Date of Patent: Nov. 30, 2004

(54) INPUT DEVICE AND METHODS AND SYSTEMS FOR SAME

(75) Inventors: Glen A Oross, Corvallis, OR (US); Memphis Zhihong Yin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 137 days.

(21) Appl. No.: 10/138,625

(22) Filed: May 3, 2002

(65) Prior Publication Data

US 2003/0206151 A1 Nov. 6, 2003

(51) Int. Cl.[7] ................................................ G06F 1/16
(52) U.S. Cl. ...................... 361/683; 345/161; 400/490; D14/400
(58) Field of Search ................................ 361/680–683; 345/161, 162; 354/168, 169, 184; 400/490–492, 495–495.1; D14/400, 412–416

(56) References Cited

U.S. PATENT DOCUMENTS

| | | | | |
|---|---|---|---|---|
| 5,473,347 A | * | 12/1995 | Collas et al. | ............... 345/169 |
| 5,541,622 A | * | 7/1996 | Engle et al. | ................. 345/161 |
| 5,594,618 A | * | 1/1997 | Sellers | ........................ 361/680 |
| 5,699,117 A | * | 12/1997 | Uramoto et al. | ......... 348/390.1 |
| 5,701,142 A | * | 12/1997 | Brown et al. | ................ 345/168 |
| 5,731,952 A | * | 3/1998 | Ohgami et al. | .............. 361/687 |
| 5,828,363 A | * | 10/1998 | Yaniger et al. | .............. 345/156 |
| 5,870,082 A | * | 2/1999 | Selker et al. | ................ 345/168 |
| 6,084,572 A | * | 7/2000 | Yaniger et al. | .............. 345/159 |
| 6,121,954 A | * | 9/2000 | Seffernick | ..................... 345/161 |
| 6,198,472 B1 | * | 3/2001 | Lection et al. | ............... 345/161 |
| 6,205,021 B1 | * | 3/2001 | Klein et al. | .................. 361/683 |
| 6,239,786 B1 | * | 5/2001 | Burry et al. | ................. 345/161 |
| 6,433,777 B1 | * | 8/2002 | Sawyer | ........................ 345/161 |

* cited by examiner

Primary Examiner—Lisa Lea-Edmonds

(57) ABSTRACT

Methods and systems for an input device are described. In one exemplary embodiment, the input device can comprise a housing and a deployable input device attached to the housing. The deployable input device can be deployed from a stowed position to an extended position without changing a desktop footprint of the computing device.

23 Claims, 12 Drawing Sheets

INPUT DEVICE AND METHODS AND SYSTEMS FOR SAME

BACKGROUND

Computers and computing devices have become ubiquitous in our society. Their presence has both raised productivity and increased the quality of life. One feature that has allowed computing devices to become so valuable is portability. Many of these computing devices, such as notebook computers, personal digital assistants (PDAs), and self-contained computer games are designed to be portable and thus a single device can be carried by a user and used in different locations. This creates many design challenges to ensure the reliability of the computing devices.

Computing devices are being designed to ever-smaller dimensions in order to increase their portability. While the smaller devices can be convenient for transport, the size can be problematic when a user actually uses the device. The smaller computing devices often have less space to allocate for user input devices, which has often resulted in input devices that are less user friendly. Additionally, traditional input devices like a mouse can be inconvenient, as the mouse is generally detached and stored separately when the computing device is transported. It must then be reattached before use.

Accordingly, this invention arose out of concerns associated with providing improved input device systems and methods.

BRIEF DESCRIPTION OF THE DRAWINGS

The same numbers are used throughout the drawings to reference like features and components.

DETAILED DESCRIPTION

Overview

In accordance with the various embodiments described below, the methods and systems relate to a deployable input device that can be used with a computing device. Some embodiments include a deployable input device that can be mounted on a housing of the computing device. In some embodiments, the deployable input device can comprise a deployable joystick. The joystick can have a stowed position and an extended position. In some embodiments, the exemplary joystick can remain in the stowed position until utilized by a user. In the stowed position, the joystick can require very little room on the computing device. Yet, when the user desires to utilize the joystick it can be quickly and easily deployed to provide a very controllable and precise input device for the user.

In some embodiments, the joystick can be deployed by pushing down on the stored joystick, which then pops-up or deploys. The user can then steer or otherwise manipulate the joystick to move a cursor or accomplish other tasks. Many of the exemplary embodiments incorporate one or more input mechanisms on the joystick so that multiple tasks can be accomplished with the joystick. For example, a button or other input mechanism can be positioned on the joystick so that a user can direct a cursor by steering the joystick and then select an icon by pressing the button.

In another application, the present embodiments can be utilized to greatly improve the ergonomics of various portable video games without sacrificing portability. When the games are used, the exemplary joystick can be deployed to the extended position to provide a high degree of control and comfort for the user. When the game is being transported, the joystick can be moved to the stowed position to minimize the risk of breakage and to maintain the compact dimensions of the game.

The joystick can be mounted on any region of the computing device that can be advantageous for a user. For example, in some embodiments, the exemplary joystick can be mounted where trackballs, trackpads, and pointing sticks, etc. have previously been mounted, or if desired, in addition to those devices. Other embodiments may utilize less traditional mounting regions that can be advantageous for the user.

The exemplary joystick can be mounted or positioned on any type of computing device where the joystick can prove advantageous. Such computing devices can comprise any suitable computing device, examples of which include, but are not limited to, stationary personal computers, portable computers, cell phones, Palm Pilot brand computers and similar products (PDAs), game or entertainment computers such as Game Boy brand computers, and the like.

EXEMPLARY EMBODIMENTS

Exemplary Host Computer

Figure 1:
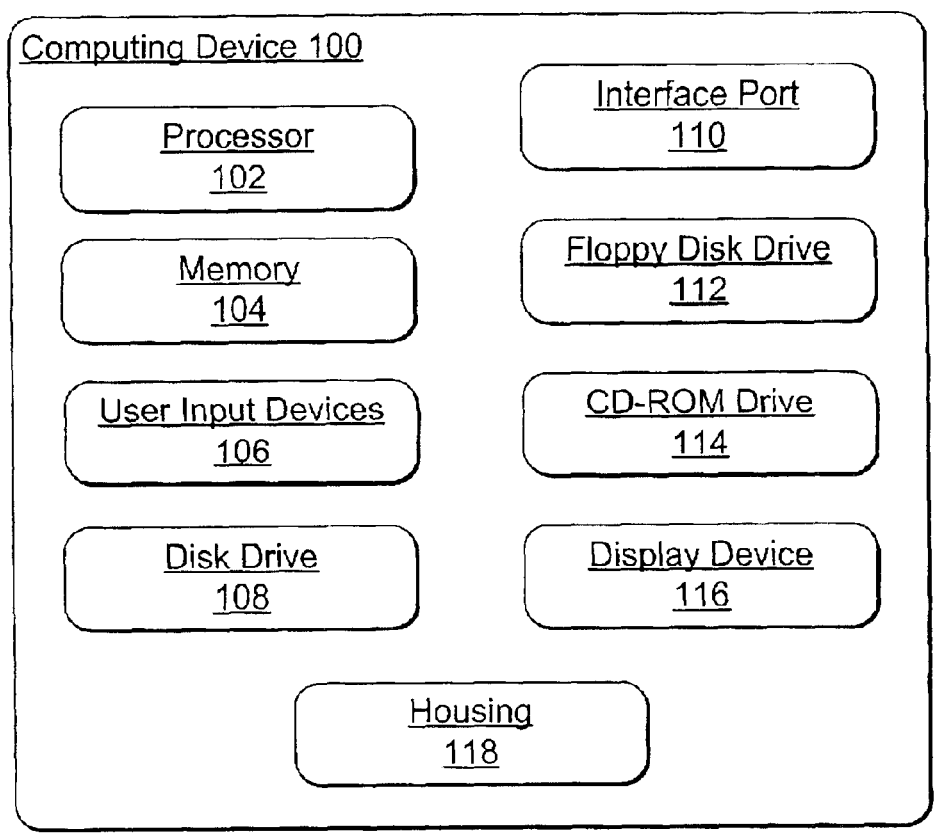
FIG. 1 is a block diagram showing components of an exemplary computing device in accordance with one embodiment.

For purposes of understanding various structures associated with an exemplary computer or computing device, consider FIG. 1, which is a block diagram showing exemplary components of a computing device 100. The computing device 100 may include a processor 102, a memory 104 (such as ROM and RAM), user input devices 106, a disk drive 108, interface port 110 for inputting and outputting data, a floppy disk drive 112, and a CD-ROM drive 114. It can further have one or more display devices 116, and a housing 118.

The processor 102 can perform various instructions to control the operation of the computing device 100. Memory 104, disk drive 108, floppy disk drive 112, and CD-ROM drive 114 can provide data storage mechanisms. User input device(s) 106 can include a keyboard, mouse, pointing device, joystick and/or other mechanism for inputting information to the computing device. Various input devices will be discussed in more detail below. Interface port 110 can provide a mechanism for computing device 100 to communicate with other devices.

The computing device can further include some type of display device 116 that can be seen, or otherwise perceived, by a computer user. Examples include cathode ray tubes (CRT), and liquid crystal displays (LCD), among others. Further, the described components can commonly be positioned relative to one another and/or protected by a housing 118. The housing can be made from various materials such as various plastics, polymers, and metals, among others. The above described components need not all be present in a particular exemplary computing device.

The computing device described herein can be one type of suitable computing device as it relates to the described embodiments, others can include, but are not limited to, personal computers, notebook computers, laptop computers, personal digital assistants (PDAs), video games, portable video games and other computing devices.

Figure 2:
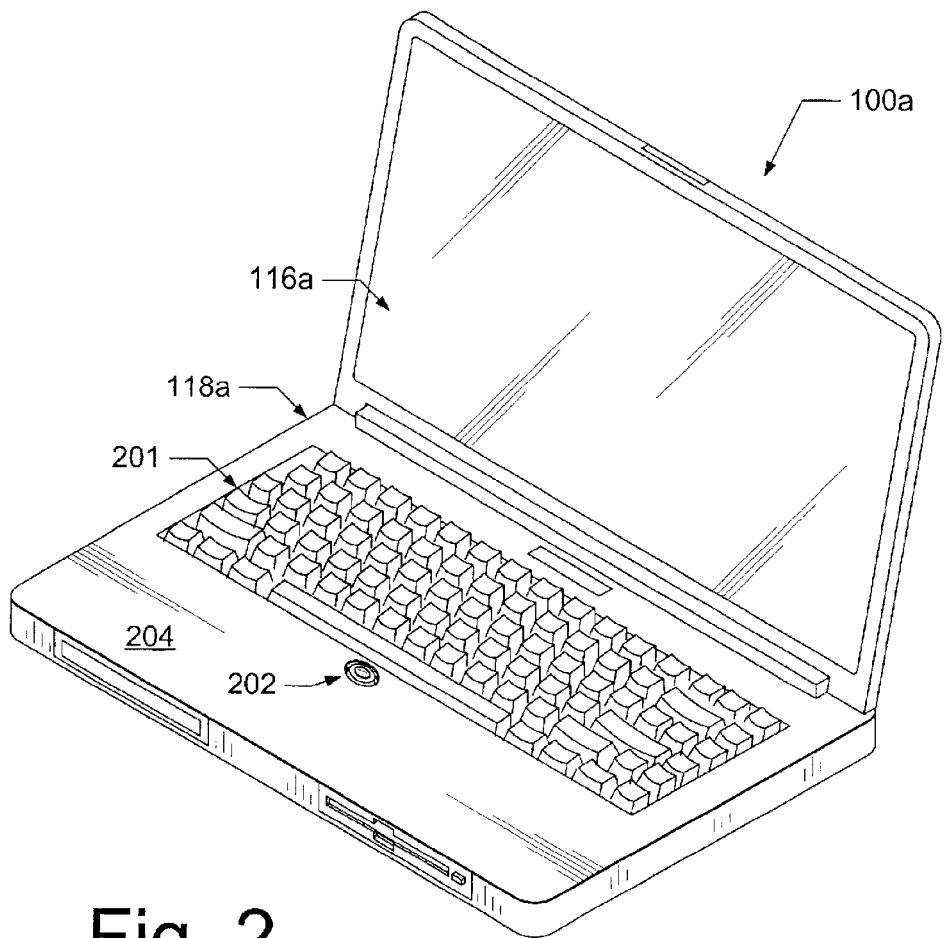
FIGS. 2–2c show perspective views of an exemplary computing device in accordance with one exemplary embodiment.

FIG. 2 shows an exemplary computing device 100a in accordance with one embodiment. In this embodiment, the computing device can comprise a notebook computer. Other exemplary computing devices are described above and below. As can be seen, the notebook computer can also include a keyboard 201. FIG. 2 further shows a means for receiving user input generally at 202. In this example, the input means comprises a deployable joystick. Other embodiments can comprise additional input devices as described above and below. Some exemplary joysticks can further have multiple input mechanisms associated with the joystick, as will be described in more detail below.

The exemplary notebook computer shown in FIG. 2 also has a display device 116a that in this embodiment can comprise an LCD screen that is positioned on a housing 118a. The notebook computer can also comprise other components, examples of which are described above.

As shown in FIG. 2, the exemplary deployable joystick 202 is connected to, or otherwise attached to, the computer's housing 118a. In the embodiment shown here, the joystick is positioned proximate a surface 204 of the housing 118a on which the keyboard 201 is also positioned.

FIG. 2 shows the deployable joystick in a stowed position. As shown here, the joystick is positioned in front of the keyboard, though other embodiments can position the joystick anywhere on the computing device that can be convenient for the user.

Figure 2A:
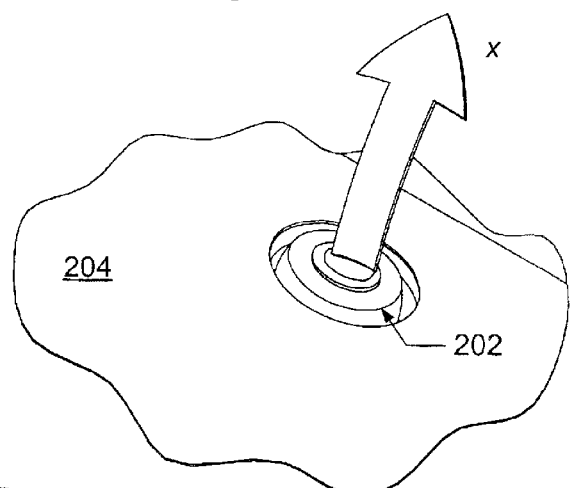
Figure 2B:
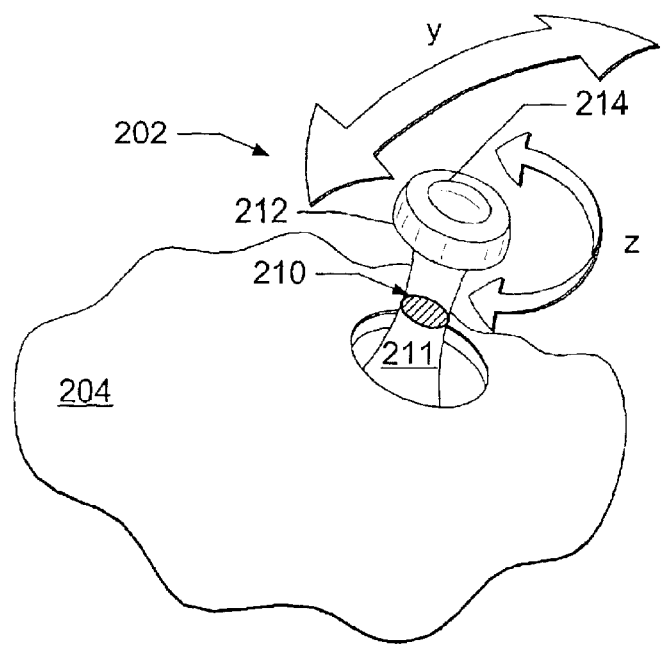

FIG. 2a shows an enlarged view of the joystick 202 in the stowed position. In this embodiment, the joystick can be quickly and easily deployed from the stowed position shown in FIG. 2a to a manipulable or steerable extended position as shown in FIG. 2b. In this embodiment, the joystick is deployed in a direction generally perpendicular to the surface 204 as shown by arrow x (FIG. 2a).

FIG. 2b shows the joystick 202 deployed to the extended position. Various biasing mechanisms, such as springs and the like, can be utilized for deploying the joystick from the stowed position to the extended position. In this embodiment, the user can push down on the joystick to release and deploy it from the stowed position. Subsequently, the user can press it down again for storage or stowing. Any suitable mechanical assembly can be utilized to effectuate the stowable release of the joystick. For example, mechanical assemblies that work along the same principles as those that are employed in "click-releasable" pens and mechanical pencils can be used. Some suitable storage and deployment mechanisms will be discussed in more detail below.

Figure 2C:
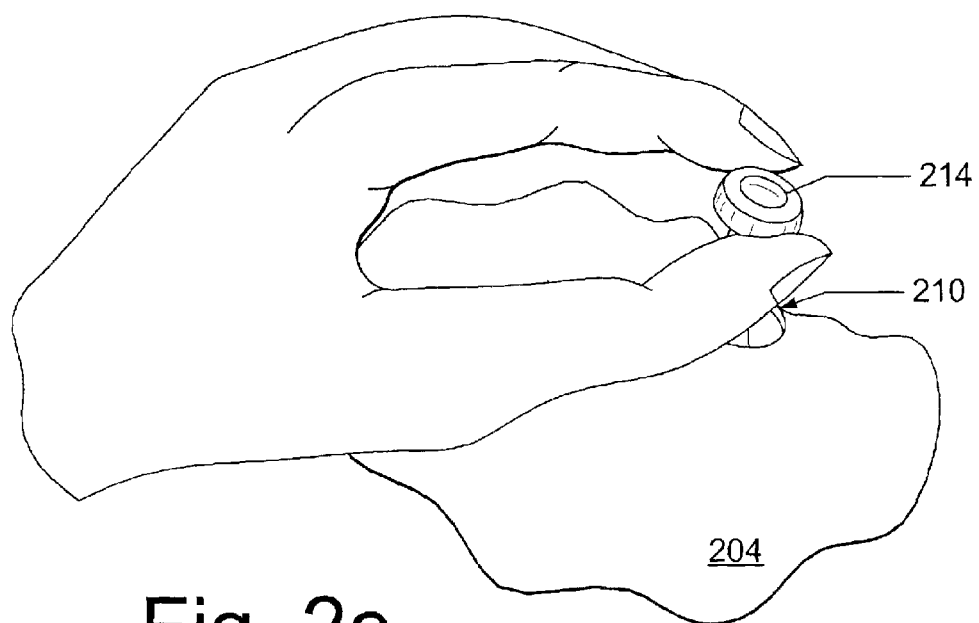

FIGS. 2b and 2c show the joystick comprising a steerable or manipulable structure 210 in the form of an elongate stem or shaft 211 that extends generally away from the housing and terminates proximate an engagement structure 212. The engagement structure is configured to enable an individual to more easily grasp and manipulate the joystick. Accordingly, any suitable configuration can be utilized for the engagement structure. In this particular example, the engagement structure comprises a knob. The knob in this example has an outer circumference that is greater than a periphery of a shaft cross-section taken transverse the long axis of the shaft. An exemplary shaft cross-section is shown in cross-hatched form mid-way up shaft 211.

As shown, an input mechanism 214 can be positioned on the knob. This can enable a user to provide input in much the same way that one can do by left- or right-clicking a mouse. Manipulable structure 210 can be grasped or otherwise steered by a user as shown in FIG. 2c. Such manipulation or steering can include, pivoting the joystick, for example along arrow y (FIG. 2b) and/or steering, for example along arrow z.

The manipulable structure 210 can be functionally coupled to various sensors that can convert user manipulation of the manipulable structure into signals that can be utilized by the computing device. Such sensors can be of the type that are used by various other types of input devices such a mouse and the like. The skilled artisan will recognize many satisfactory embodiments of suitable sensor configurations, some of which will be discussed below.

In this embodiment, the input mechanism 214 can allow a user to make an input as desired. This input can be in addition to signals generated through manipulation or steering of the joystick. This user input can be utilized for various purposes in various embodiments. For example, a user can move a cursor on the notebook computer display device by manipulating the manipulable structure 210 to position a cursor on a desired icon on the display device. The user can then activate the input mechanism 214 to 'click' or select the icon.

As shown in this exemplary embodiment, the input mechanism 214 is located on the manipulable structure 210. Many other exemplary configurations are possible, some of which will be discussed in more detail below.

Figure 3:
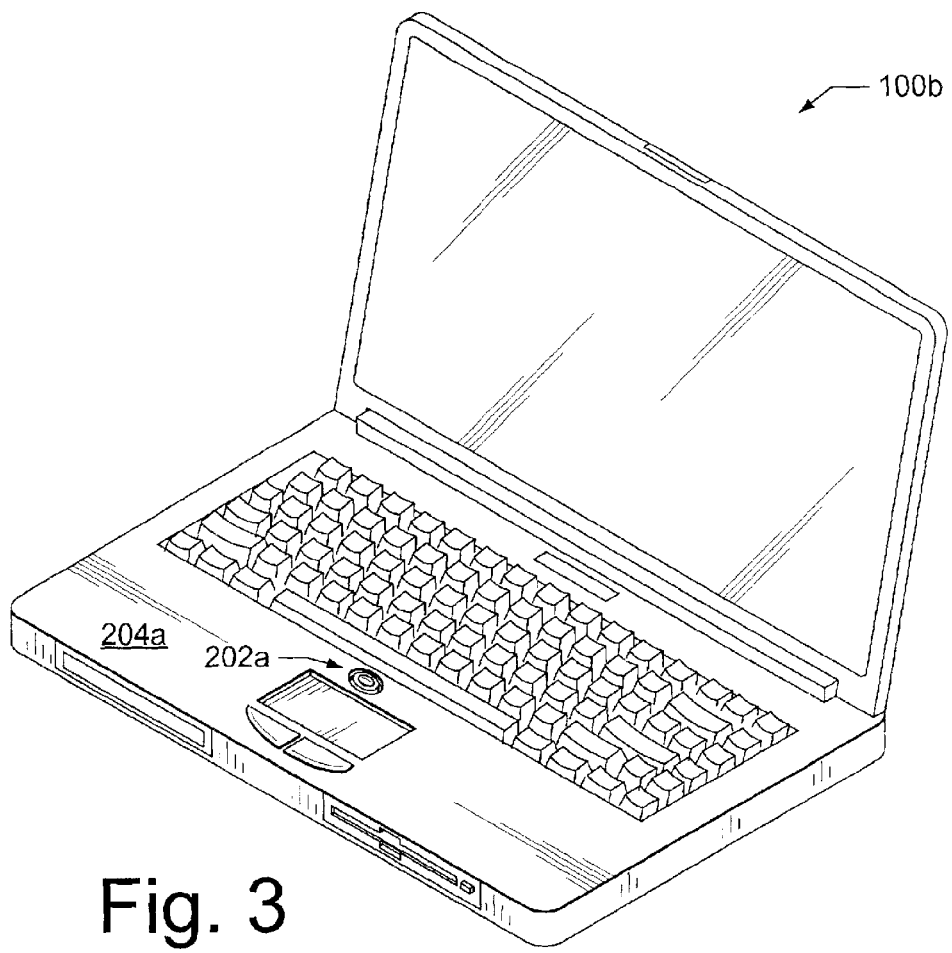
FIGS. 3–3c show perspective views of an exemplary computing device in accordance with one exemplary embodiment.
Figure 3A:
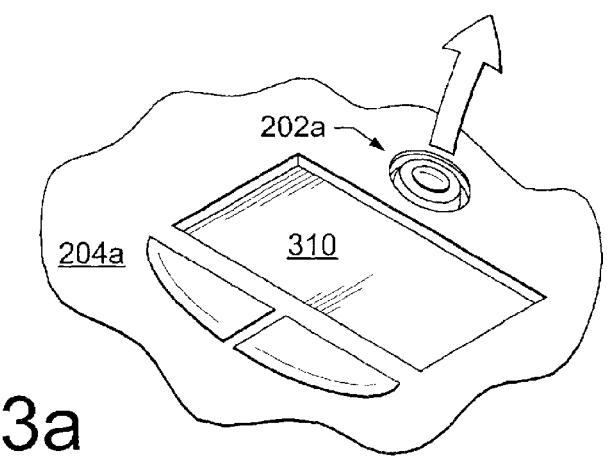
Figure 3B:
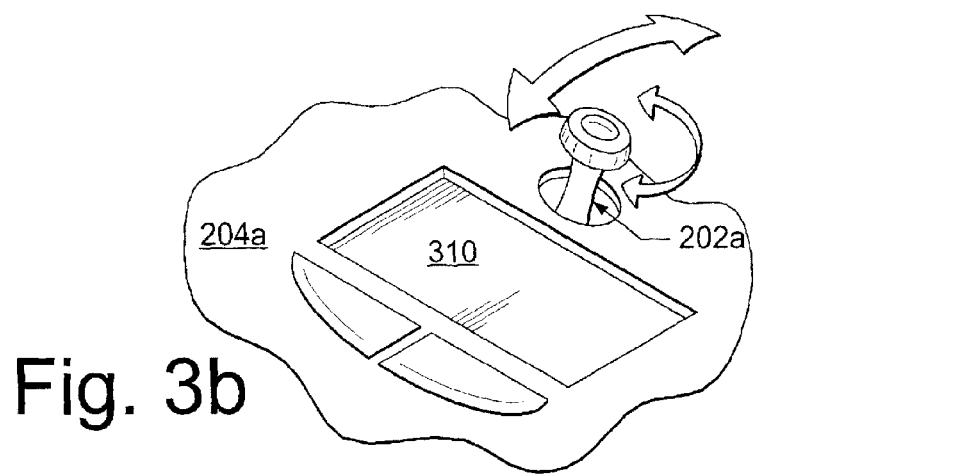
Figure 3C:
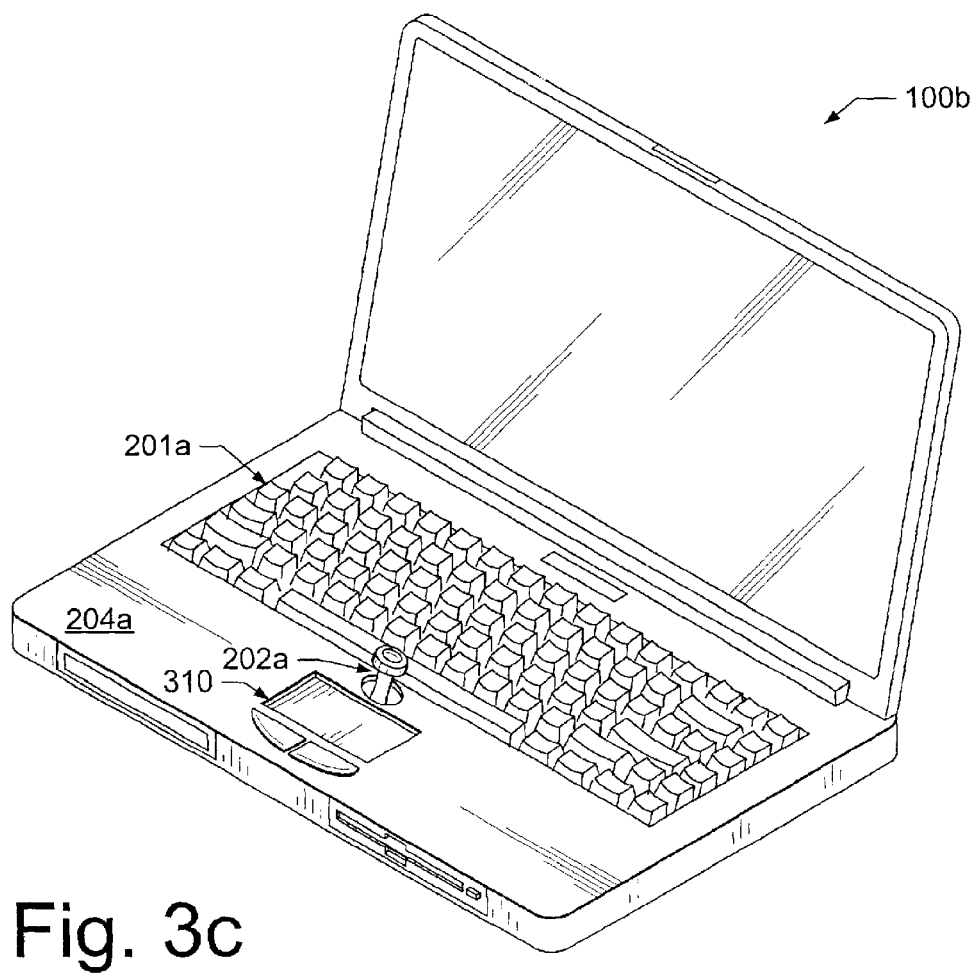

Consider now the exemplary embodiment shown in FIGS. 3–3c. A computer user can open the notebook computer 100b, and deploy the joystick 202a from a stowed position to an extended position (shown FIG. 3b) and begin working.

In this exemplary embodiment, a desktop footprint of the computing device can remain unchanged whether the joystick is in the stowed or the extended position. Additionally, the act of deploying the joystick can be accomplished without increasing the footprint. This can prove valuable when space is at a premium. For example, a computer user may be at an airport terminal waiting to board a flight, and wants to get some work done in the interim in a space-restricted area such as an airport seat or a crowded restaurant area.

The user can simply open the computer, deploy the joystick 202a from the stowed position to the extended position, and begin working. As shown here, the joystick simply pops up vertically from the stowed position to the extended position (this is described in more detail in relation to FIGS. 5 and 6). The user can then utilize the deployable joystick 202a so he can work more comfortably and with greater efficiency. In this example, as noted above, space may be limited. For example, the user may have to place the computer on his lap. Any type of input device that is complicated to deploy, such as a mouse, that must be plugged into an interface port can be undesirable and cumbersome to use in such an environment. For example, the user may have to hold the computer with one hand and so may only have one free hand with which to deploy the input device. Thus, input devices that require both hands to deploy or use can be less satisfactory.

Additionally, in this example, when the user's flight boards he should be able to quickly store the computer and board the airplane. In some of the current embodiments, the user can simply depress the joystick from the extended position to the stowed position, shut the computer and go. Other exemplary embodiments can store the joystick automatically. For example, when the user closes the computer, the housing can physically push the joystick down to the stowed position.

In still other embodiments, the joystick can be deployed automatically when the computer is opened, and stowed automatically when the computer is closed. This can be achieved mechanically as described above, electronically, or electro-mechanically. For example, some embodiments can be deployed upon powering-up the computer and stowed upon powering-down the computer.

Now referring again to the airline passenger example, when the passenger is seated in the airplane, he can simply open the computer, redeploy the joystick, and continue his work. In this example, the footprint of the computer may take up essentially the entire tray table, maybe with the exception of a little room for a beverage. In such a situation, an input device that increases the computer's desktop footprint, during either use or deployment can be undesirable, and could lead to a spilled beverage.

Referring again to FIGS. 3–3a, the joystick 202a can be seen in the stowed position. This can be compared with FIGS. 3b–3c where the joystick is deployed to the extended position. The footprint of the computer in each of these dispositions is the same. As seen in this embodiment, the joystick does not increase the footprint of the computer during deployment, or when in the storage and/or extended positions. Further, note that in this embodiment, other input devices such as the keyboard 201a, and trackpad 310, can be utilized regardless of the position of the joystick.

Figure 4:
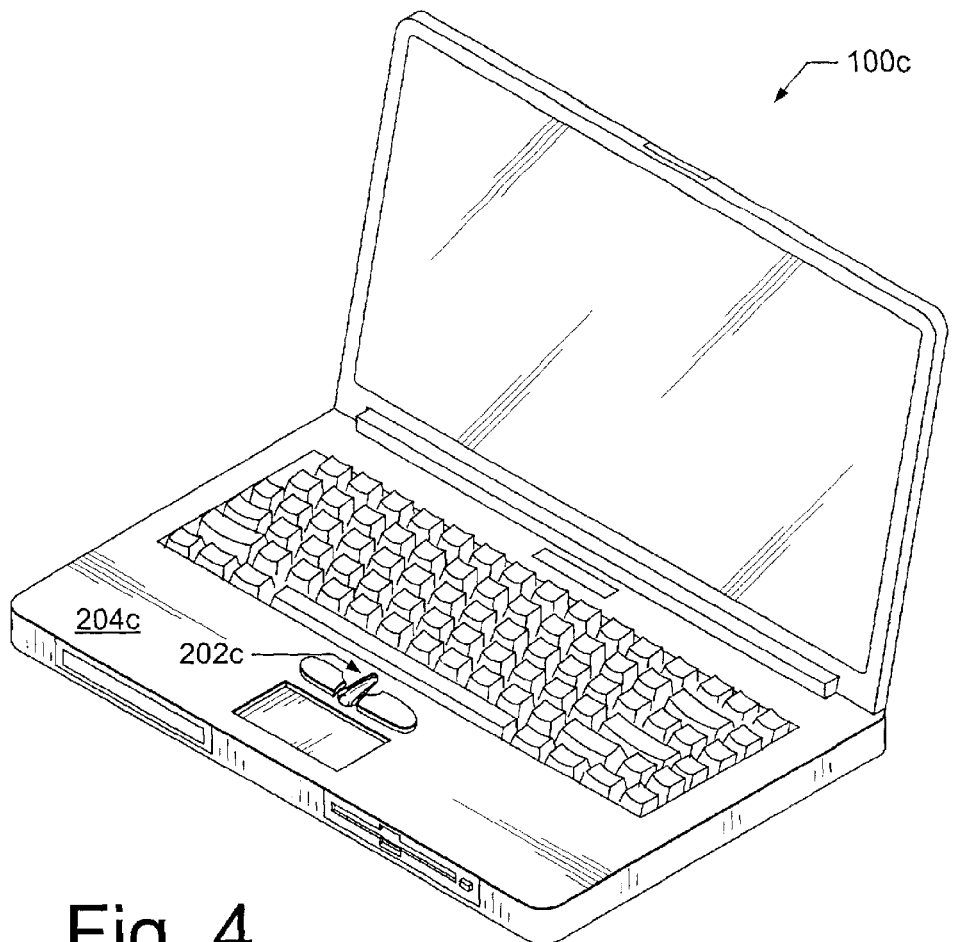
FIGS. 4–4c show perspective views of an exemplary computing device in accordance with one exemplary embodiment.
Figure 4A:
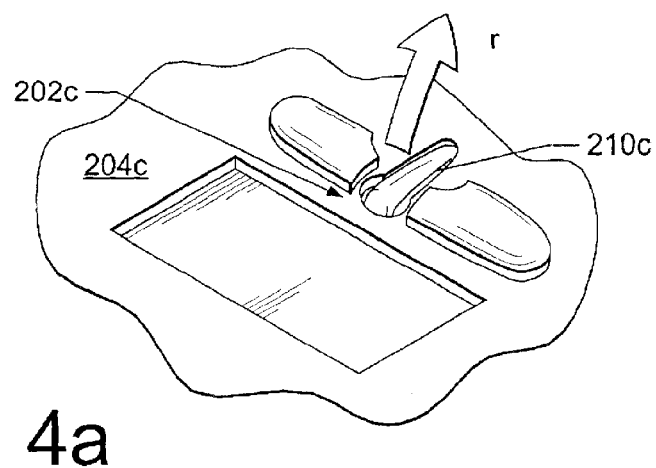
Figure 4B:
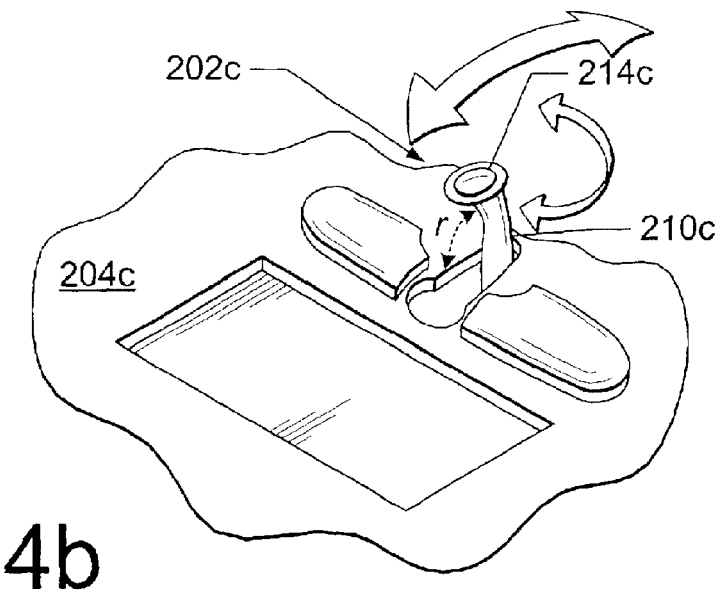
Figure 4C:
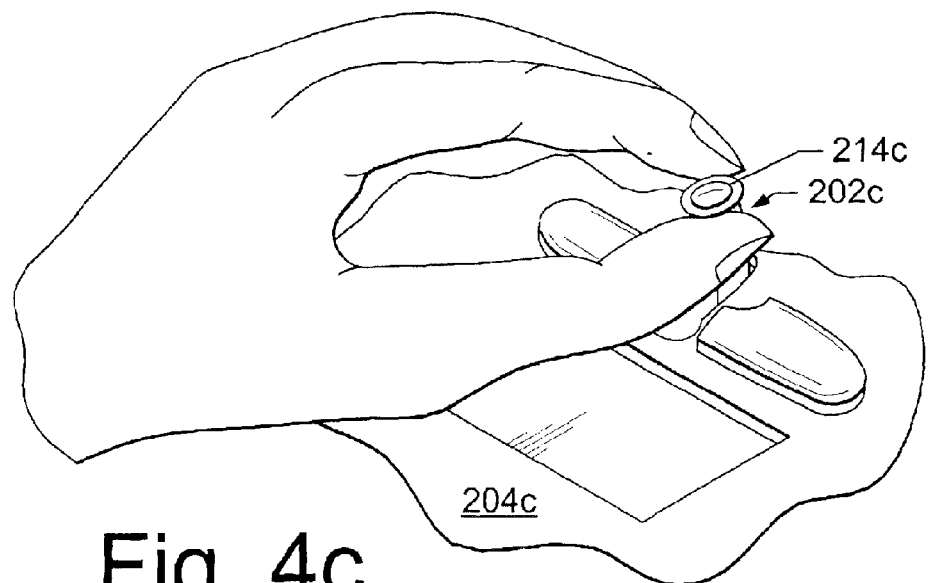

FIGS. 4–4c show a further embodiment utilizing a deployable joystick 202c on a notebook computer 100c. FIG. 4 shows the computer with the joystick in a stowed position. FIG. 4a shows an enlarged view of the joystick as shown in FIG. 4 and further shows how the joystick can be deployed along an arc r that can allow the joystick to be deployed from a stowed position that is generally parallel to a surface 204c on which it is mounted, to an extended position generally perpendicular to the surface. In the embodiment shown here, the joystick can deploy away from a user. Other exemplary embodiments can deploy in other directions, including but not limited to, toward the user.

As shown here the manipulable structure 210c is configured to be mounted on the housing where it can be deployed from the stowed position in which a user cannot use the structure to provide input, to the extended position in which a user can use the structure to provide input. This can all be done without changing the footprint of the computing device.

FIG. 4b shows an enlarged view of the joystick 202c in the extended position. A manipulable structure 210c is provided and a user-activatable input mechanism 214c is connected to the manipulable structure. FIG. 4c shows a user steering or manipulating the joystick. In addition, the user can also press the input mechanism 214c while steering the joystick, although this is not specifically illustrated.

In another application, shown in FIGS. 5–8, the deployable joystick is incorporated in a portable video game device (also considered a "computing device") and provides a desirable degree of controllability without sacrificing portability.

Figure 5:
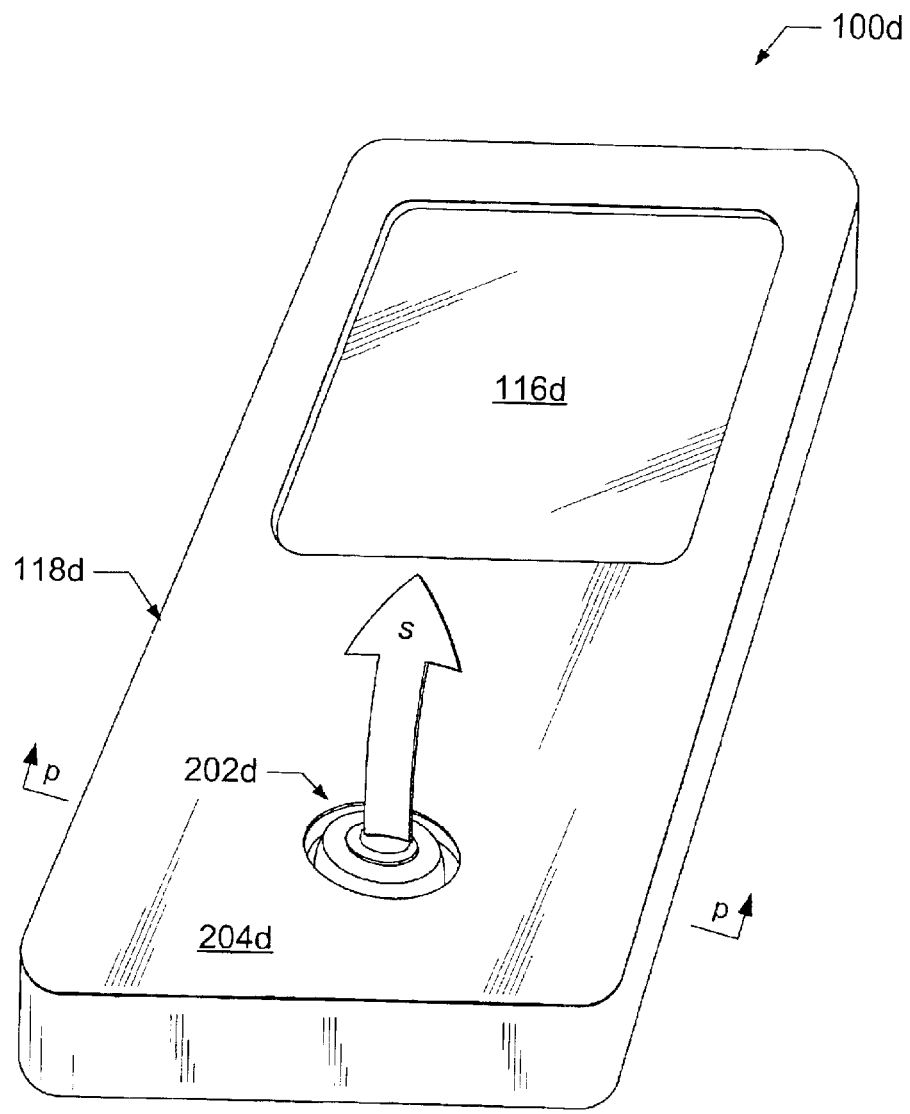
FIGS. 5 and 6 show perspective views of an exemplary computing device in accordance with one exemplary embodiment.

FIG. 5 shows an exemplary computing device 100d that comprises a screen or display device 116d and a deployable joystick 202d mounted within a housing 118d. The joystick is shown in the stowed position in the figure. This configuration can protect the joystick when it is not in use. For example, portable video games are commonly used by teenagers who often carry them in their book bags along with schoolbooks and other items. In such an environment, a protruding input device or other structure would likely be broken thus rendering the device inoperative. However, the deployable joystick shown in these embodiments can reduce the chance of damage during transport since the joystick is protected by the housing when in the stowed position.

Figure 6:
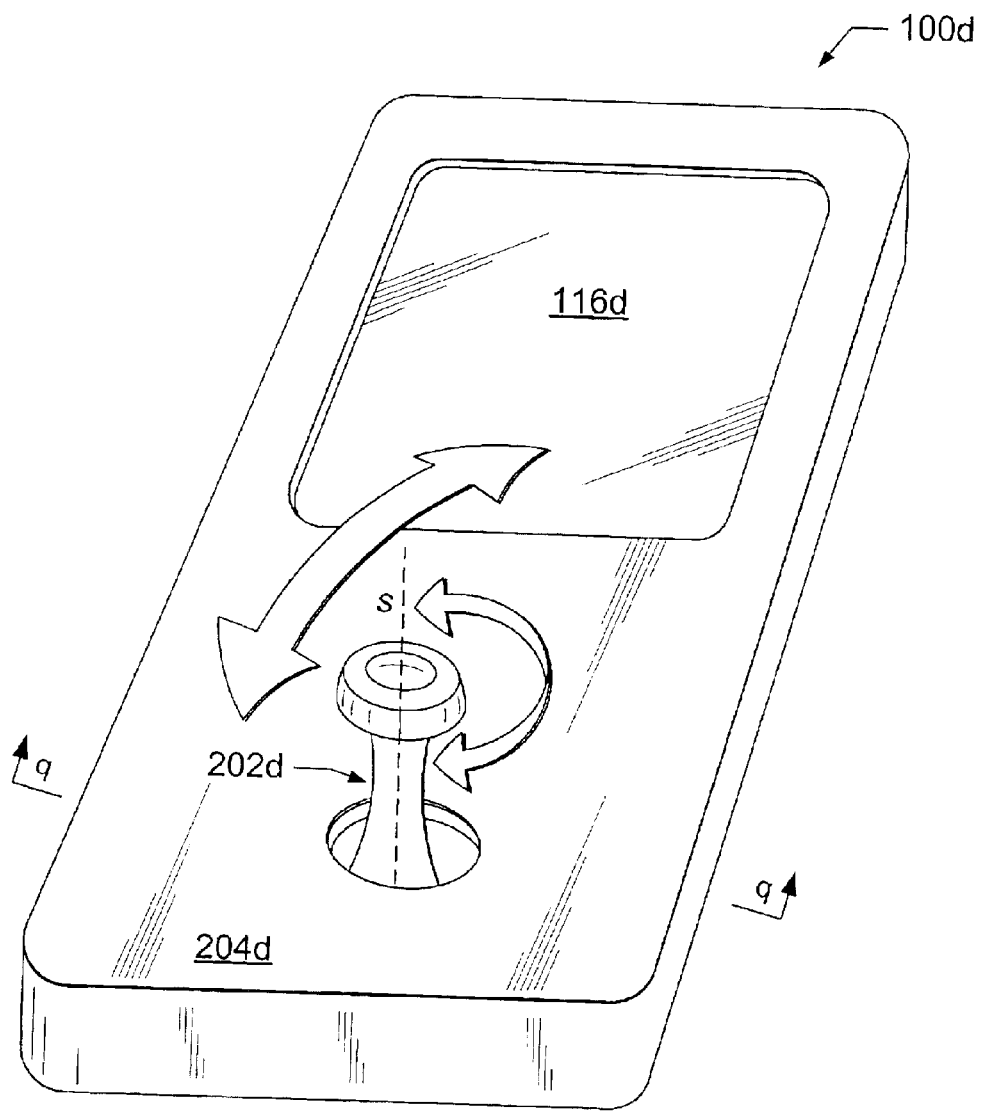

FIG. 6 shows the joystick 202d deployed to the extended position. As shown in this embodiment, the joystick is deployed along its own long axis s. In this embodiment, the long axis s can be generally orthogonal to the surface 204d. Other configurations are also possible, some of which are discussed above and below.

Figure 5A:
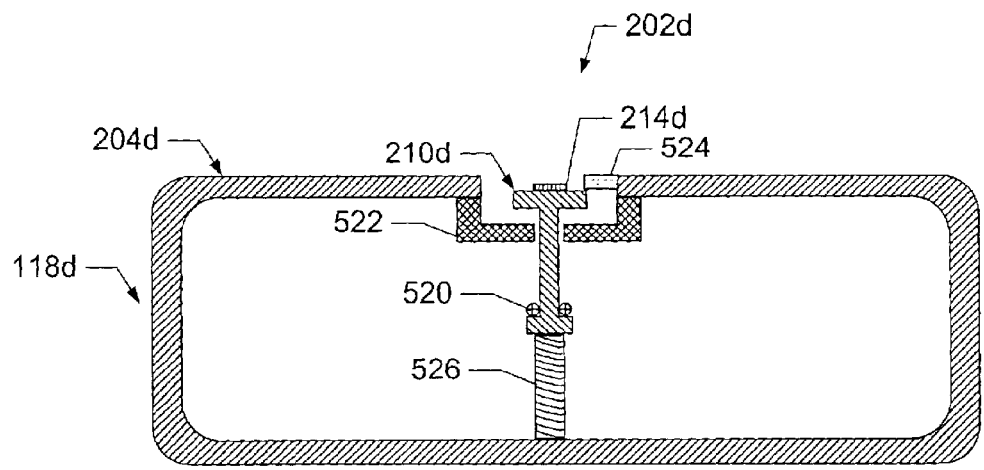
FIGS. 5a and 6a show cross-sectional views of an exemplary computing device in accordance with one embodiment.
Figure 6A:
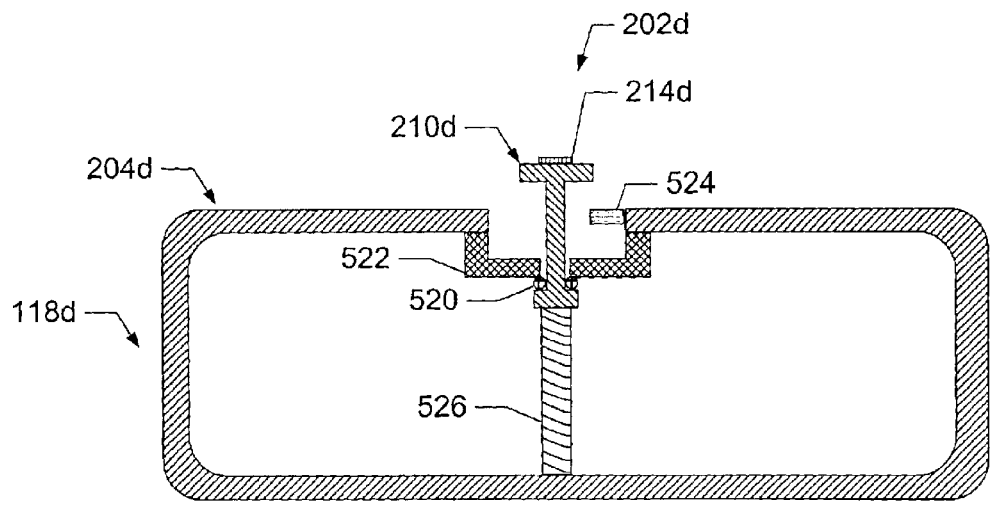

FIGS. 5a and 6a show cross-sectional representations taken along lines p—p and q—q in FIGS. 5 and 6 respectively. FIG. 5a shows a cross section of the housing 118d with the joystick 202d in the stowed position. While FIG. 6a shows a cross-section of the housing 118d with the joystick 202d in the extended position. In this exemplary embodiment, the joystick includes a manipulable structure 210d that can be steered by a user. Also, in this exemplary embodiment, one or more sensors 520 can be positioned to sense movement of the manipulable structure.

The sensors can generate signals that can be recognized or utilized as input commands by the computing device. Some exemplary manipulable structures can have sensors incorporated within, and/or as a part of, the manipulable structures. Other exemplary embodiments can have various other configurations as will be recognized by one of skill in the art.

The joystick, as shown in FIGS. 5a and 6a, can also comprise a base 522 for orienting and/or attaching the manipulable structure relative to the housing. Also, in this embodiment, the joystick can have an input mechanism 214d positioned on the top of the manipulable structure. This can be utilized for various purposes, some of which have been described above.

Other embodiments can have the manipulable structure serve as an additional input device. For example, in one embodiment, after the manipulable structure is deployed to the extended position it can be pulled upward and twisted to a position that prevents it from being pushed down into the stowed position. A user can then use the manipulable structure to move a game character or complete other input commands. Additionally, the user can depress or click the manipulable structure to fire a weapon or other game input. One of skill in the art will recognize many other satisfactory configurations.

FIGS. 5a and 6a further show a detent 524 for holding the manipulable structure in the stowed position. In this embodiment, the detent operates in a fashion similar to a ballpoint pen—e.g., push down or click once to store, push down again to deploy to the extended position. Other configurations will be recognized by those of skill in the art and include, but are not limited to, an electronically controlled mechanism for holding the joystick in the stowed position. In one exemplary embodiment, turning the power on to the video game can cause a signal to be sent to the detent to release the joystick so the game is ready for the user.

As shown in FIGS. 5a and 6a, the manipulable structure, once released from the detent, can be pushed upward to the extended position by a biasing structure. Any suitable means can be used for deploying the joystick. For example, a host of different biasing structures such as springs, elastomeric structures, and the like can be used. For example, coil springs, leaf springs, and the like can be used to deploy the joystick. As shown here, the biasing structure comprises spring 526. Other various configurations using springs and motors, among others, will be recognized by the skilled artisan.

Figure 7:
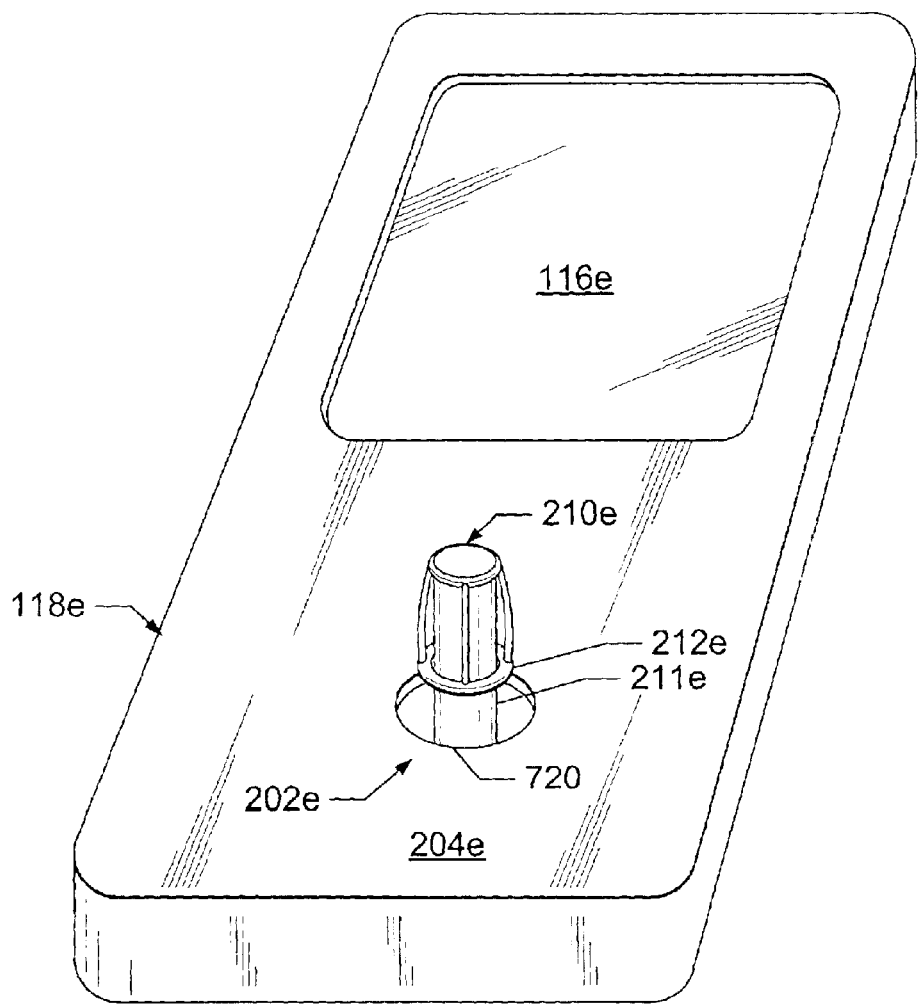
FIGS. 7 and 8 show perspective views of an exemplary computing device in accordance with one exemplary embodiment.

FIG. 7 shows another exemplary embodiment in which the joystick 202e is in the extended position. In this embodiment, the joystick can comprise a manipulable structure 210e that can comprise a shaft 211e and an engagement structure 212e.

In this example, the joystick has just been deployed from the stowed position in a hole 720 in the housing 118e, and the engagement structure is in a closed or compact position that can allow the joystick to be more easily stored.

Figure 8:
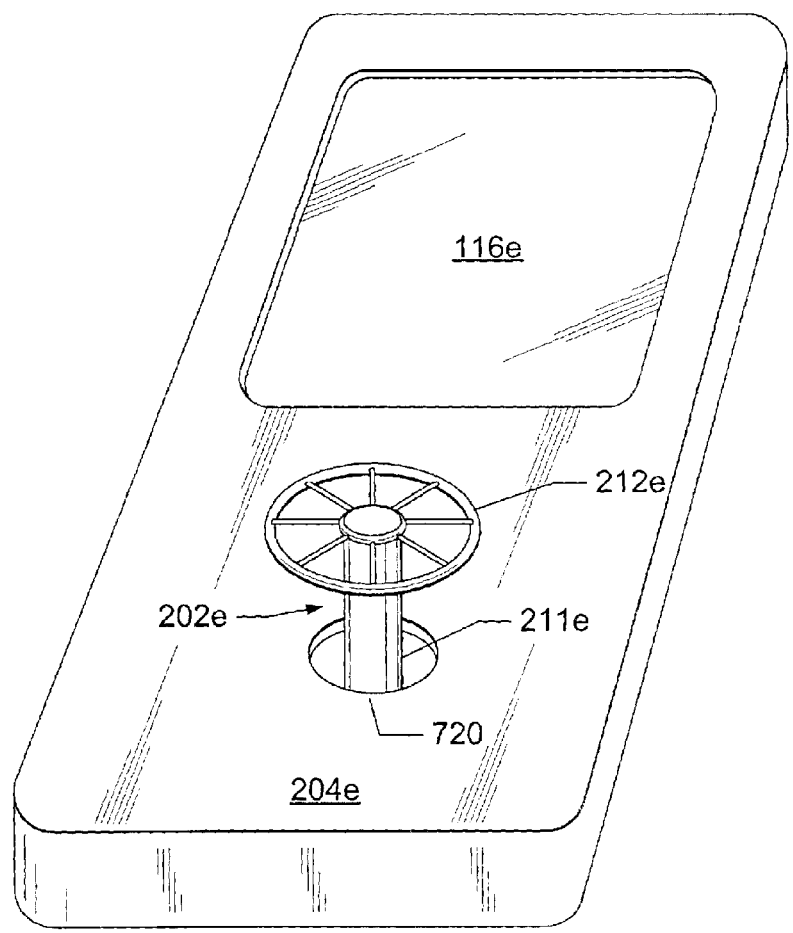

This configuration can be contrasted with that of FIG. 8, where the engagement structure is in an opened or expanded position. In this embodiment, the engagement structure opens in an umbrella-like fashion. The expandable configuration can allow a user to exercise greater dexterity with the joystick. The expanded position can provide an ergonomically satisfying manipulable structure for the user. Also, some embodiments can employ this configuration to provide a more realistic feeling for the user. For example, as shown in FIG. 8, the engagement structure can resemble a wheel shape such as a steeringwheel. A user can find this more pleasing for certain applications than other configurations.

Various sensor configurations can be utilized to maximize the advantages provided by the engagement structure. For example, in this exemplary embodiment, the sensors can be configured to sense rotation of the joystick so that the steeringwheel configuration can be utilized in various car or driver type games. Other embodiments can comprise configurations that are specifically suitable for various types of games and/or uses. Some exemplary embodiments can also be configured to provide a joystick that when fully deployed is more comfortable for users with large hands yet can be quickly stored in a compact form that has minimal affect on the computing device.

Figure 7A:
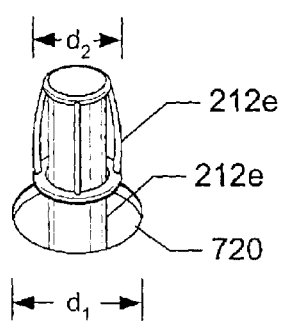
FIGS. 7a and 8a show perspective views of an exemplary input device in accordance with one exemplary embodiment.
Figure 8A:
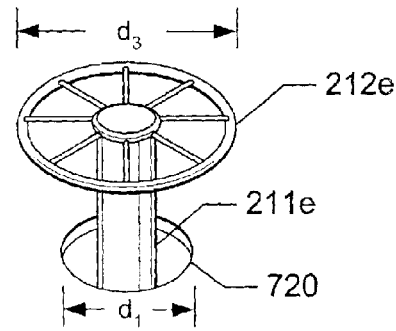

FIGS. 7a and 8a show the joystick in isolation from the computing device. The engagement structure 212e is shown in the closed position in FIG. 7a and the open position in FIG. 8a. Notice in FIG. 7a that hole 720 has a diameter $d_1$ that is greater than the diameter $d_2$ of the engagement structure in the closed position. The hole's diameter is, however, less than the diameter $d_3$ of the engagement structure in the open position as shown in FIG. 8a. Thus, by virtue of the fact that the engagement structure is closeable or collapsible, the joystick can be used on various computing devices without requiring an inordinately large hole in the housing.

Various configurations of the engagement structure can be utilized in the described embodiments. As shown here; the open diameter $d_3$ is greater than two times the diameter $d_2$ in the closed position. While the engagement position can allow greater user control in the open position, some embodiments allow user input in both the open and closed positions.

CONCLUSION

The described embodiments can provide a deployable joystick for use on a computing device. The joystick can remain protected and out of the way when in a stowed position, but can be deployed to an extended position as desired. In some embodiments, the joystick can be incorporated onto the computing device without increasing or otherwise changing the desktop footprint of the computing device. The joystick can offer increased controllability for a user when compared to other input devices. Some embodiments can have additional input mechanisms associated with the joystick to allow the user to direct the computing device in various ways. The deployable nature of the described embodiments can provide the usability of a joystick without the space requirements and inconvenience of current technologies. The various exemplary embodiments when deployed can provide configurations suitable for a wide range of applications and users, while being easy to store and deploy.

Although the invention has been described in language specific to structural features and methodological steps, it is to be understood that the invention defined in the appended claims is not necessarily limited to the specific features or steps described. Rather, the specific features and steps are disclosed as preferred forms of implementing the claimed invention.

What is claimed is:

1. A computing device comprising:
    a housing; and,
    a deployable input device attached to the housing, wherein the deployable input device can be deployed from a stowed position to an extended position without changing a desktop footprint of the computing device, and wherein the deployable input device is rotatable about an axis for generating input signals.

2. The computing device of claim 1, wherein said input signals comprise first input signals and further comprising an input mechanism positioned on the deployable input device for enabling a user to provide second different input signals to the computing device.

3. The computing device of claim 1, wherein the housing comprises a surface, and the deployable input device is deployed along the axis generally orthogonal to the surface.

4. The computing device of claim 1 further comprising spring means associated with the deployable input device for deploying the input device.

5. An input device comprising:
    a manipulable structure that can generate signals that correspond to manipulation of the structure by a user;
    at least one user-activatable input mechanism positioned upon said manipulable structure;
    the manipulable structure being configured to be mounted on a housing of a computing device and deployed from a stowed position in which a user cannot use the structure to provide input, to an extended position in which a user can use the structure to provide input; and,
    deployment of the manipulable structure taking place without changing a desktop footprint of the computing device.

6. The input device of claim 5, wherein the input mechanism comprises a button that can be pressed.

7. The input device of claim 5, wherein the manipulable structure is elongate and comprises a long axis and can be deployed in a direction along its long axis.

8. A computing device comprising at least in part the input device of claim 5.

9. A computing device comprising:
    a housing;
    an elongate stem on the housing, the elongate stem having a long axis, and capable of being deployed from a stowed position within the housing to an extended position without the housing;

the elongate stem being deployable in a direction along the long axis;

the elongate stem being configured to generate input signals responsive to engagement by a user; and, a depressible button on the stem configured to generate additional input signals responsive to being depressed by the user.

10. The computing device of claim 9 embodied as a notebook computer.

11. The computing device of claim 9 embodied as a game device.

12. A computing device comprising:

an elongate shaft that extends along a long axis, the shaft being configured to be deployed between a stowed position within the computing device and an extended position in which a user can, with one hand, grasp and manipulate the shaft for providing input signals to the computing device; and, the shaft being deployable without changing a desktop footprint of the computing device and being rotatable about the long axis for generating input signals.

13. The computing device of claim 12, wherein the shaft is deployed in a direction along the long axis.

14. The computing device of claim 12, wherein the shaft extends along the long axis toward a terminal end, and further comprising an engagement structure connected proximate the terminal end and configured to be grasped between a thumb and a forefinger of a user.

15. The computing device of claim 14, wherein the engagement structure comprises a knob having an outer circumference that is greater than a periphery of a shaft cross-section taken transverse the long axis of the shaft.

16. The computing device of claim 12, wherein the shaft is spring releasable for deployment.

17. A method of using a computing device comprising:

accessing an input device that is mounted on a computing device;

moving the input device from a stowed position to an extended position without changing a desktop footprint of the computing device;

manipulating the input device to provide first user input signals to the computing device; and, generating second different input signals by depressing an input mechanism positioned on the input device.

18. The method of claim 17, wherein the input device is elongate and extends along a long axis, and said moving comprises extending the input device in a direction along the long axis.

19. The method of claim 17, wherein the input device is mounted proximate a keyboard on the computing device, and said moving comprises click-releasing the input device.

20. A computing device comprising:

a steerable means for receiving a first user input on a computing device, the computing device having a desktop footprint;

means for deploying the receiving means from a stowed position to an extended position without increasing the desktop footprint of the computing device; and, a user input means positioned on the steerable means and configured for receiving a second user input.

21. The computing device of claim 20, wherein the receiving means comprises a joystick.

22. The computing device of claim 20, wherein the receiving means comprises a joystick and further comprising expandable means on the joystick for expanding to receive user input.

23. The computing device of claim 20, wherein the deploying means comprises a spring.

\* \* \* \* \*